(12) United States Patent
Doremus et al.

(10) Patent No.: US 10,654,551 B1
(45) Date of Patent: May 19, 2020

(54) METHOD OF OVERSHOOT FOR FASTER PLANING OF MARINE VESSEL

(71) Applicant: GM Global Technology Operations LLC, Detroit, MI (US)

(72) Inventors: Jonathan D. Doremus, Novi, MI (US); Trevor Fayer, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/274,549

(22) Filed: Feb. 13, 2019

(51) Int. Cl.
*B63H 21/21* (2006.01)
*B63H 21/22* (2006.01)
*B63H 21/17* (2006.01)
*B63B 1/24* (2020.01)
*B63B 1/18* (2006.01)

(52) U.S. Cl.
CPC .............. *B63H 21/21* (2013.01); *B63B 1/18* (2013.01); *B63B 1/246* (2013.01); *B63H 21/17* (2013.01); *B63H 21/22* (2013.01); *B63H 2021/216* (2013.01)

(58) Field of Classification Search
CPC ........ B63H 20/00; B63H 20/10; B63H 20/12; B63H 20/14; B63H 20/20; B63H 20/22; B63H 21/00; B63H 21/21; B63H 21/213; B63H 21/22
USPC ............................... 440/1, 84, 86, 87; 701/21
See application file for complete search history.

(56) References Cited

U.S. PATENT DOCUMENTS

| | | | | |
|---|---|---|---|---|
| 6,273,771 | B1 * | 8/2001 | Buckley | B63H 21/213 440/84 |
| 6,884,128 | B2 * | 4/2005 | Okuyama | B63H 21/21 440/1 |
| 7,494,394 | B2 * | 2/2009 | Walser | B63B 49/00 440/1 |
| 7,877,174 | B2 * | 1/2011 | Walser | B63B 49/00 440/1 |

* cited by examiner

*Primary Examiner* — Lars A Olson
(74) *Attorney, Agent, or Firm* — Cantor Colburn LLP

(57) ABSTRACT

A method of planing a marine vessel propelled by an electric propulsion system operably connected to a rotatable propeller system including that a command input requesting an increase in throttle is received. The method also includes that it is determined whether the marine vessel is on plane and whether there is sufficient power and energy available in the electric propulsion system to reach planing speed when the marine vessel is not on plane. The method further includes that power output from the electric propulsion system is increased for a selected period of time such that the electric propulsion system is allowed to overshoot continuous power limits of one or more components of the electric propulsion system for the selected amount of time. The one or more components of the electric propulsion system including at least one of an electric motor, an energy storage device, and an electric controller.

18 Claims, 2 Drawing Sheets

METHOD OF OVERSHOOT FOR FASTER PLANING OF MARINE VESSEL

INTRODUCTION

The subject disclosure relates to marine vessels, and more particularly relates to methods and systems for propelling marine vessels.

Typical marine vessels require a great deal of power to overcome drag forces and accelerate to a planing position. The power required to accelerate the marine vessel to the planing position often determines the sizing of the marine propulsion system.

SUMMARY

In one exemplary embodiment, a method of planing a marine vessel propelled by an electric propulsion system operably connected to a rotatable propeller system is provided. The method including that a command input requesting an increase in throttle is received. The method also includes that it is determined whether the marine vessel is on plane. The method also include that it is determined whether there is sufficient power and energy available in the electric propulsion system to reach planing speed when the marine vessel is not on plane. The method further includes that power output from the electric propulsion system is increased for a selected period of time such that the electric propulsion system is allowed to overshoot continuous power limits of one or more components of the electric propulsion system for the selected amount of time. The one or more components of the electric propulsion system including at least one of an electric motor, an energy storage device, and an electric controller.

In addition to one or more of the features described herein, or as an alternative, further embodiments may include that it is determined whether the marine vessel is on plane in response to a throttle position, a water speed, a deck angle, a draft depth, a trim angle, an estimated drag profile, and an estimated load mass.

In addition to one or more of the features described herein, or as an alternative, further embodiments may include that it is determined whether there is sufficient power and energy available in the electric propulsion system to reach planing speed in response to a current history form algorithm, an available power estimation, a current limit requirement, an energy needed to get to planing speed, and a power needed to get to planing speed.

In addition to one or more of the features described herein, or as an alternative, further embodiments may include that an amount of power output to increase for the selected period of time is determined in response to a target acceleration profile, a water speed, a global positioning system speed, a draft depth, an estimated drag profile, and an estimated load mass.

In addition to one or more of the features described herein, or as an alternative, further embodiments may include that the power output from the electric power system is decreased at a completion of the selected period of time such that the one or more components of the electric propulsion system are no longer overshooting continuous power limits.

In addition to one or more of the features described herein, or as an alternative, further embodiments may include that power to the electric motor is adjusted for cruising on plane. The method may also include that a trim is set for an efficient planing angle when it is determined that the marine vessel is on plane.

In another exemplary embodiment, a controller for planing a marine vessel propelled by an electric propulsion system operably connected to a rotatable propeller system is provided. The controller including: a processor and a memory including computer-executable instructions that, when executed by the processor, cause the processor to perform operations. The operations including that a command input requesting an increase in throttle is received. The operations also includes that it is determined whether the marine vessel is on plane. The operations also include that it is determined whether there is sufficient power and energy available in the electric propulsion system to reach planing speed when the marine vessel is not on plane. The operations further includes that power output from the electric propulsion system is increased for a selected period of time such that the electric propulsion system is allowed to overshoot continuous power limits of one or more components of the electric propulsion system for the selected amount of time. The one or more components of the electric propulsion system including at least one of an electric motor, an energy storage device, and an electric controller.

In addition to one or more of the features described herein, or as an alternative, further embodiments may include that it is determined whether the marine vessel is on plane in response to a throttle position, a water speed, a deck angle, a draft depth, a trim angle, an estimated drag profile, and an estimated load mass.

In addition to one or more of the features described herein, or as an alternative, further embodiments may include that it is determined whether there is sufficient power and energy available in the electric propulsion system to reach planing speed in response to a current history form algorithm, an available power estimation, a current limit requirement, an energy needed to get to planing speed, and a power needed to get to planing speed.

In addition to one or more of the features described herein, or as an alternative, further embodiments may include that the operations further include that an amount of power output to increase for the selected period of time is determined in response to a target acceleration profile, a water speed, a global positioning system speed, a draft depth, an estimated drag profile, and an estimated load mass.

In addition to one or more of the features described herein, or as an alternative, further embodiments may include that the operations further include that power output from the electric power system is decreased at a completion of the selected period of time such that the one or more components of the electric propulsion system are no longer overshooting continuous power limits.

In addition to one or more of the features described herein, or as an alternative, further embodiments may include that the operations further include that power to the electric motor is adjusted for cruising on plane and a trim is set for an efficient planing angle when it is determined that the marine vessel is on plane.

In another exemplary embodiment, a computer program product embodied on a non-transitory computer readable medium is provided. The computer program product including instructions that, when executed by a processor, cause the processor to perform operations for planing a marine vessel propelled by an electric propulsion system operably connected to a rotatable propeller system, the operations. The operations including that a command input requesting an increase in throttle is received. The operations also includes that it is determined whether the marine vessel is on plane. The operations also include that it is determined whether there is sufficient power and energy available in the electric propulsion system to reach planing speed when the marine vessel is not on plane. The operations further includes that power output from the electric propulsion system is increased for a selected period of time such that the electric propulsion system is allowed to overshoot continuous power limits of one or more components of the electric propulsion system for the selected amount of time. The one or more components of the electric propulsion system including at least one of an electric motor, an energy storage device, and an electric controller.

In addition to one or more of the features described herein, or as an alternative, further embodiments may include that it is determined whether the marine vessel is on plane in response to a throttle position, a water speed, a deck angle, a draft depth, a trim angle, an estimated drag profile, and an estimated load mass.

In addition to one or more of the features described herein, or as an alternative, further embodiments may include that it is determined whether there is sufficient power and energy available in the electric propulsion system to reach planing speed in response to a current history form algorithm, an available power estimation, a current limit requirement, an energy needed to get to planing speed, and a power needed to get to planing speed.

In addition to one or more of the features described herein, or as an alternative, further embodiments may include that the operations further include that an amount of power output to increase for the selected period of time is determined in response to a target acceleration profile, a water speed, a global positioning system speed, a draft depth, an estimated drag profile, and an estimated load mass.

In addition to one or more of the features described herein, or as an alternative, further embodiments may include that the operations further include that power output from the electric power system is decreased at a completion of the selected period of time such that the one or more components of the electric propulsion system are no longer overshooting continuous power limits.

In addition to one or more of the features described herein, or as an alternative, further embodiments may include that the operations further include that power to the electric motor is adjusted for cruising on plane and a trim is set for an efficient planing angle when it is determined that the marine vessel is on plane.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
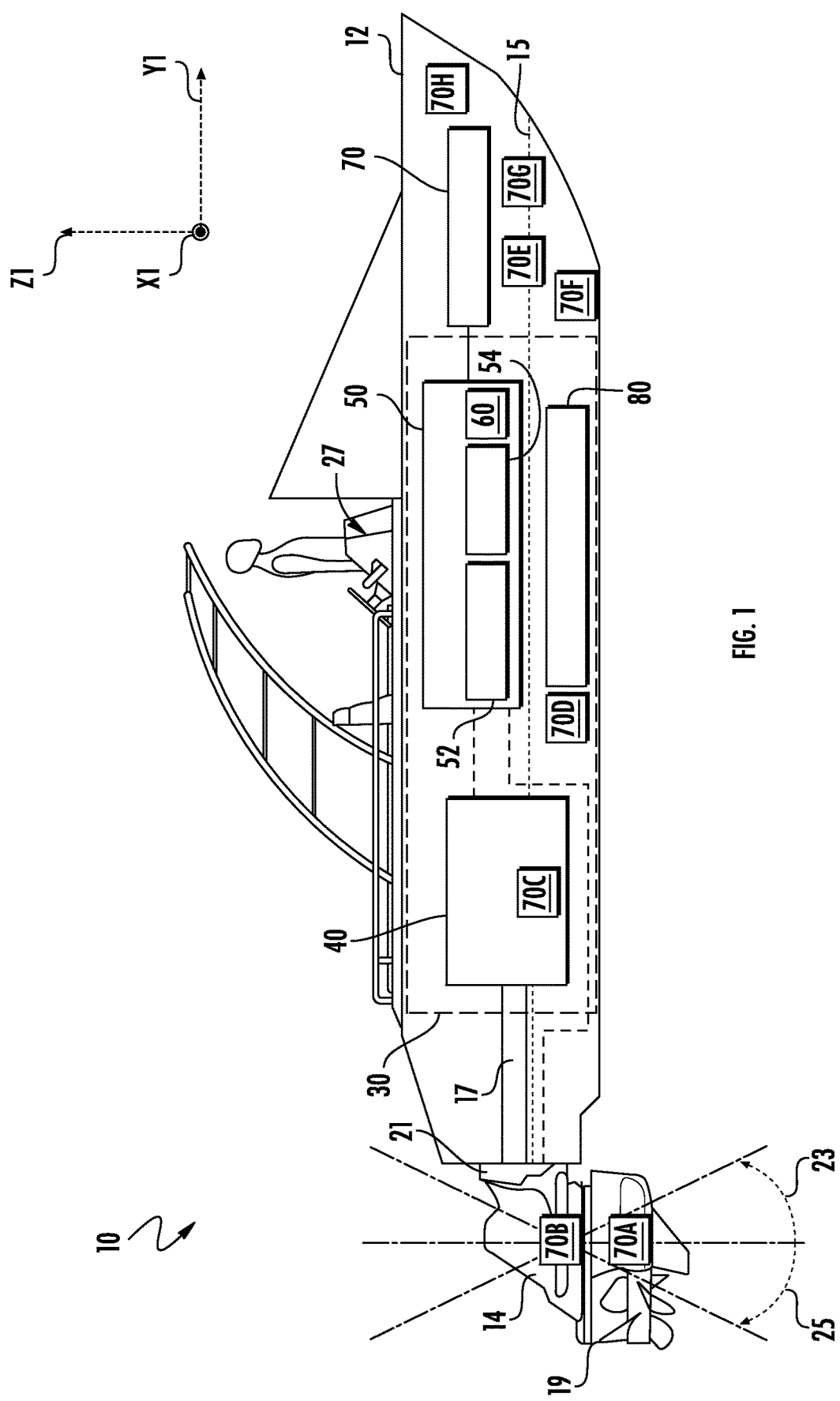
FIG. 1 is a block diagram of a marine vessel, according to an embodiment of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components (e.g., memory elements, digital signal processing elements, logic elements, look-up tables, or the like), which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Typical marine vessels require a great deal of power to overcome drag forces and accelerate to a planing position. The power required to accelerate the marine vessel to the planing position often determines the sizing of the marine propulsion system. The power required to accelerate the marine vessel to the planing position is often greater than the power required to cruise in the planing position. Therefore marine propulsion systems are often oversized for cruising at a planing speed. Embodiments of the present disclosure seek to allow a lower powered marine electric propulsion system to temporarily output a higher power in order to reach a planing position, at which point the power is then reduced to the propulsion system's continuous limit where the marine vessel can cruise efficiently on plane.

Referring now to FIG. 1, a marine vessel 10 that has a hull 12. The marine vessel 10 includes an electric propulsion system 30 operatively connected to a rotatable propeller system 14 for moving the hull 12. The electric propulsion system 30 includes an electric motor 40, an electronic controller 50, and an energy storage device 80. It should be appreciated that, although particular systems are separately defined in the schematic block diagrams, each or any of the systems may be otherwise combined or separated via hardware and/or software. The electric motor 40 is operably connected to the rotatable propeller system 14. The electric motor 40 may be operably connected to the rotatable propeller system 14 through a transmission 17. The transmission 17 may include a drive shaft extending from the electric motor 40 to the rotatable propeller system 14. It is understood that the embodiments disclosed herein are not limited to a driveshaft transmission system and the embodiments disclosed herein may be utilized with other transmission systems interconnecting an electric motor 40 with the rotatable propeller system 14. The rotatable propeller system 14 may include its own internal transmission (not shown for simplicity) to convert the rotation of the transmission 17 to the rotation of a propeller 19. The rotatable propeller system 14 may include a trim device 21 configured to adjust an angle of attack of the propeller 19 and may trim the propeller either upward 23 or downward 25. It is understood that the marine vessel 10 may include other devices capable of helping trim the marine vessel 10 including but not limited to trim tabs on the bottom of the hull 12 or any similar trim device known one of skill in the art.

The electric motor 40 may be electrically connected to, and powered by, an energy storage device 80. The energy storage device 80 may be a battery system (e.g., a battery or bank of batteries), a fuel cell, a flow battery, and others devices capable of storing and outputting electric energy. In an embodiment, the energy storage device 80 may include a battery system, which may employ multiple batteries organized into battery banks. The energy storage device 80 is electrically connected to at least one of the electric motor 40 and the electronic controller 50 and may be directly connected to the electric motor 40 or connected to the electric motor 40 through the electronic controller 50.

The sensor system 70 may include a plurality of sensors 70A, 70B, 70C, 70D, 70E, 70F, 70G, 70H located in a variety of locations throughout the marine vessel 10. The sensors 70A-70H may be in wired and/or wireless communication with the electronic controller 50. The sensor system 70 may include a sensor 70A configured to detect propulsive power of the rotatable propeller system 14. In an embodiment, the sensor 70A may not be required and propulsive power may be a calculated signal determined from sensed inputs within the electronic controller 50. The sensor system 70 may also include a sensor 70B to detect a trim angle of the marine vessel 10. The sensor system 70 may include a sensor 70C to detect operation data of the electric motor 40, such as, for example rotations per minute, temperature, etc. The sensor system 70 may include a sensor 70D to detect operation data of the energy storage device 80, such as for example, voltage, current, and temperature of each battery "cell" within of the energy storage device. From the detected voltage, current, and temperature of each battery cell of the energy storage device 80 a state of charge of the energy storage device, a state of health of the energy storage device, and a temperature of the energy storage device may be determined. The sensor system 70 may include a sensor 70E to detect a deck angle of a deck 15 of the marine vessel 10. The deck 15 may form a plane about parallel to the X-axis X1 and the Y-axis Y1 when the marine vessel 10 is on plane. The deck 15 may also be about perpendicular to the Z-axis Z1 when the marine vessel 10 is on plane. The sensor 70E may be configured to measure the deck angle along the X-axis X1 and the Y-axis Y1. The sensor system 70 may include a sensor 70F to detect a water speed of the marine vessel 10. The sensor system 70 may include a sensor 70G to detect global positioning system (GPS) parameters of the marine vessel 10, which may include but are not limited to a GPS land speed of the marine vessel 10, water flow directions, weather, or other similar GPS parameters known to one of skill in the art. The sensor system 70 may include a sensor 70H to detect a draft depth of the marine vessel 10.

The electronic controller 50 has a memory 54 and processor 52 that executes a stored algorithm 60 for planing of the marine vessel 10 utilizing a combination of sensor data from the sensor system 70 and control input from a control input panel 27. The electronic controller 50 includes one or more control modules, with one or more processors 52 and tangible, non-transitory memory (e.g., read-only memory (ROM)) whether optical, magnetic, flash, or otherwise. The electronic controller 50 may also include sufficient amounts of memory 54 such as, for example, random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

It should be appreciated that the electronic controller 50 may be configured as a single or distributed control device that is electrically connected to or otherwise placed in hard-wired or wireless communication with the sensor system 70, the electric motor 40, the transmission 17, the rotatable propeller system 14, and various marine vessel components, including sensors 70A-70H, for transmitting and receiving electrical signals for proper execution of the algorithm 60.

The electronic controller 50 can be a host machine or distributed system (e.g., a computer such as a digital computer or microcomputer) acting as a marine vessel control module, and/or as a proportional-integral-derivative (PID) controller device having a processor and a tangible, non-transitory computer-readable memory such as read-only memory (ROM) or flash memory. Therefore, the controller 50 can include all software, hardware, memory, algorithms, connections, sensors, etc., necessary to monitor and control the marine vessel 10. As such, one or more control methods executed by the controller 50 can be embodied as software or firmware associated with the controller 50. It is to be appreciated that the controller 50 can also include any device capable of analyzing data from various sensors 70A-70H, comparing data, and making decisions required to monitor when the marine vessel 10 is attempting to plane and to temporarily increase power to help overcome drag forces of the water and get the boat onto plane to cruise. Moreover, the electronic controller 50 can be configured in different embodiments to include an electric motor controller, a rotatable propeller system controller, and other controllers onboard or offboard the marine vessel 10.

The marine vessel 10 may include a control input panel 27 to allow an individual piloting the marine vessel 10 (i.e., a captain) to input control commands to a controller 50. The controller 50 may receive the control controller commands, adjust the control commands in response to data from the sensor system 70, and then transmit the adjusted control commands to the electric motor 40 and/or the rotatable propeller system 14. An individual piloting the marine vessel 10 may also enter an input into the control input panel 27 indicating that another individual is in tow (i.e., other marine vessel or tube) of the marine vessel 10, which may be referred to as a captain selectable mode switch input. The individual piloting the marine vessel may indicate that another individual is in tow through a captain selectable mode switch on the control input panel 27.

Figure 2:
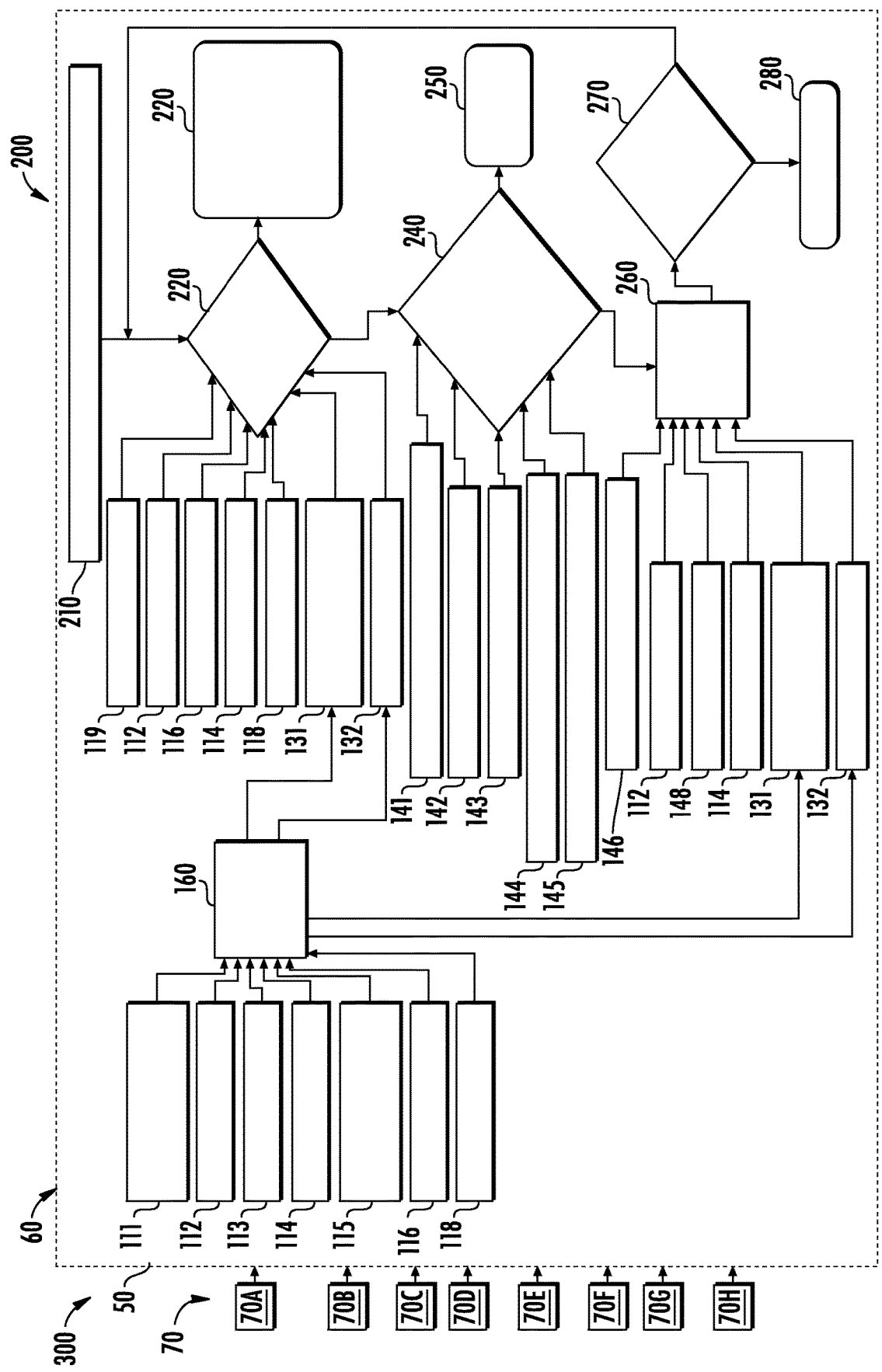
FIG. 2 is a block chart diagram illustrating an algorithm for planing the marine vessel of FIG. 1 using an overshoot method, according to an embodiment of the present disclosure.

Referring to FIG. 2, with continued reference to FIG. 1, a planing system 300 for planing the marine vessel 10 is illustrated, in accordance with an embodiment of the present disclosure. The planing system 300 on the marine vessel 10 includes various sensors 70A-70H, and includes the controller 50 that receives input signals from the sensors 70A-70H so that the processor 24 can carry out the stored algorithm 60 represented as various modules each modeling aspects of the marine vessel operation based on the sensor inputs. Although only eight sensors 70A-70H are depicted, many more sensors may be included in the planing system 300. Based on the input from the sensors 70A-70H, the controller 50 can estimate or calculate various operating characteristics of the marine vessel 10 as described herein.

The algorithm 60 begins by determining an estimated drag profile 131 and an estimated load mass 132 in real-time using an extended kalman filter (EKF) 160. The estimated drag profile 131 is an estimate of the drag experienced by the hull 12 of the marine vessel 10. The estimated load 132 is an estimate of the total weight of people and cargo on the marine vessel 10. The algorithm 60 determines at least one of the estimated drag profile 131 and the estimated load mass 132 in response to at least one of a drag model definition 111, a water speed 112, a propulsive power 113, a draft depth 114, a captain selectable mode switch input 115, a deck angle 116, and a trim angle 118. The drag model definition 111 may be a baseline standard drag model for the specific marine vessel 10. The water speed 112 detected by the sensor 70F and may be the speed of the marine vessel 10 relative to the water speed that the marine vessel 10 is traveling through. The water speed 112 may be detected in real-time. The propulsive power 113 may be the propulsive power of the rotatable propeller system 14 detected by sensor 70A or a calculated signal a discussed herein. The propulsive power 113 may be detected in real-time. The draft depth 114 may be detected by sensor 70H. The draft depth 114 may be detected in real-time. The deck angle 116 may be detected by sensor 70E. The deck angle 116 may be detected in real-time. The trim angle 118 may be detected by sensor 70B. The trim angle 118 may be detected in real-time. The captain selectable mode switch input 115 may be received from the control input panel 27 in real-time.

The algorithm 60 maintains and updates the estimated drag profile 131 and the estimated load mass 132 by incorporating data from multiple sources using the EKF 160. The EKF 160 is a non-linear filter based on Recursive Bayesian Filters. Recursive Bayesian Filters, also referred to as Recursive Bayesian Estimation, essentially substitute the posterior of an estimation into the prior position to calculate a new posterior on a new estimation iteration. An EKF is a commonly used tool that allows a non-measurable aspect of a defined system be estimated based on other measurable inputs.

The updates to the estimated drag profile 131 and the estimated load mass 132 may be continually provided to an overshoot method 200 in real time. The overshoot method 200 may allow a temporary increase to the power to the electric propulsion system 30 when the marine vessel 10 is attempting to get on plane for efficient cruising. The temporary increase in power is referred to as overshoot and this overshoot only occurs for a selected period of time so as not to damage components the electric propulsion system 30. The overshoot method 200 begins at block 210, where a command input requesting an increase in throttle is detected. The increase in throttle may be detected at the control input panel 27. Once an increase in throttle is detected at block 210, the overshoot method 200 moves on to block 220, where the algorithm 60 detects whether the marine vessel 10 is on plane in response to the throttle position 119, the water speed 112, the deck angle 116, the draft depth 114, the trim angle 118, the estimated draft profile 131, and the estimated load mass 132. If at block 220 the marine vessel 10 is determined to be on plane then the overshoot method 200 moves onto block 230 to disable overshoot and set the trim for an efficient planing angle.

If at block 220 the marine vessel 10 is determined to not be on plane then the overshoot method 200 moves onto block 240 to determine whether there is sufficient power and energy available in the energy storage device 80 to get to planing speed. The algorithm 60 determines whether there is sufficient power and energy to get to planing speed in response to a current history form algorithm 141, an available power estimation 142 of the energy storage device 80, current limit requirements 143, energy needed to get to planing speed 144, and the power needed to get to planing speed 145.

The current history form algorithm 141 may include monitoring a root means squared (RMS) electrical current over a variety of time-windows that correspond to the time windows that the current limit requirements 143 are also based upon. The current history form algorithm 141 may also include monitoring an average electrical current over the same time windows as the RMS electrical current. There may be a current history form algorithm 141 for the each component of the electric propulsion system 30 including the energy storage device 80, the electronic controller 50, and the electric motor 40. The available power estimation 142 is an estimation of the available power within the energy storage device 80.

The current limit requirements 143 (e.g., the RMS and averages limits) are commonly defined over certain time windows. There may be a current limit requirement 143 for the each component of the electric propulsion system 30 including the energy storage device 80, the electronic controller 50, and the electric motor 40. For example, a cell of the energy storage device 70D may be able to provide 100 amps of discharge current for 5 seconds, but it can only provide 50 amps of discharge current for 10 second. A "continuous" rating for a cell may be only 5 amps of discharge current. These limits must be imposed via software or hardware design such that they may never exceeded. If these limits are exceeded, there is risk of permanent damage to the cells of the energy storage device 80. Similar current limit requirements 143 may exist for the electronic controller 50 and the electric motor 40.

The energy needed to get to planing speed 144 is the total amount of energy required to go from a present water speed of a marine vessel 10 to a planing speed of the marine vessel 10. Advantageously determining the energy needed to get to planing speed 144 allows for a comparison between the current history form algorithm 141 and the current limit requirements 143 to determine if the energy storage device 70D is able to provide the necessary energy over the selected period required to perform the overshoot. The power needed to get to planing speed 145 is the peak instantaneous power output required from the electric motor 40 to reach planing speed.

If at block 240 there is insufficient power or insufficient energy available to get to planing speed then the overshoot method 200 moves onto block 250 to disable overshoot. If at block 240 there is sufficient power and energy available to get to planing speed then the overshoot method 200 moves onto block 260 to enable overshoot. At block 260, overshoot is enabled and overshoot parameters are determined in response to a target acceleration profile 146, the water speed 112, a GPS speed 148, the draft depth 114, the estimated drag profile 131, and the estimated load mass 132. The target acceleration profile 146 is a calibration that defines a specific acceleration profile versus water speed that has been chosen to provide a smooth, a natural "feel" to the captain and passengers of the marine vessel 10. Advantageously, the target acceleration profile 146 may conceals the operation of the overshoot method 200 from the captain and passengers of the marine vessel 10 and also enables a consistency of operation during the overshoot method 200.

The overshoot parameters may include the amount of power allowed for the overshoot event and the estimated time to plane. Also at block 260, power output from the electric propulsion system 30 is increased for a selected period of time such that one or more of the components of the electric propulsion system 30 are allowed to overshoot continuous power limits for one or more components of the electric propulsion system 30 for the selected amount of time. The selected period of time, may be the time period that the electric motor 40 may be temporarily allowed to exceed the continuous power limits of the one or more components without damaging the one or more components. The continuous power limits may include any operational restriction of the electric motor 40, the electronic controller 50, or the energy storage device 80 such as, for example, torque of the electric motor 40, RPM of the electric motor 40, a current of any component of the electric propulsion system 30, a voltage of any component of the electric propulsion system 30, or any other operational restriction of any component of the electric propulsion system 30 that may result in damage to that component if the operational restriction was exceeded for greater than a selected period of time.

The overshoot method 200 then moves to block 270 to determine whether an estimated time to plane has been exceed. If at block 270, the estimated time to plane is not exceeded then the overshoot method 200 moves back to block 220. If at block 270, the estimated time to plane is exceeded then the overshoot method 200 moves to block 280 where the overshoot method 200 is exited.

As described above, embodiments can be in the form of processor-implemented processes and devices for practicing those processes, such as a processor. Embodiments can also be in the form of computer program code containing instructions embodied in tangible media, such as network cloud storage, SD cards, flash drives. CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of planing a marine vessel propelled by an electric propulsion system operably connected to a rotatable propeller system, the method comprising:

receiving a command input requesting an increase in throttle;

determining whether the marine vessel is on plane;

determining whether there is sufficient power and energy available in the electric propulsion system to reach planing speed when the marine vessel is not on plane; and increasing power output from the electric propulsion system for a selected period of time such that the electric propulsion system is allowed to overshoot continuous power limits of one or more components of the electric propulsion system for the selected amount of time, the one or more components of the electric propulsion system comprising at least one of an electric motor, an energy storage device, and an electric controller.

2. The method of claim 1, wherein it is determined whether the marine vessel is on plane in response to a throttle position, a water speed, a deck angle, a draft depth, a trim angle, an estimated drag profile, and an estimated load mass.

3. The method of claim 1, wherein it is determined whether there is sufficient power and energy available in the electric propulsion system to reach planing speed in response to a current history form algorithm, an available power estimation, a current limit requirement, an energy needed to get to planing speed, and a power needed to get to planing speed.

4. The method of claim 1, further comprising: determining an amount of power output to increase for the selected period of time in response to a target acceleration profile, a water speed, a global positioning system speed, a draft depth, an estimated drag profile, and an estimated load mass.

5. The method of claim 1, further comprising: decreasing power output from the electric power system at a completion of the selected period of time such that the one or more components of the electric propulsion system are no longer overshooting continuous power limits.

6. The method of claim 1, further comprising:

adjusting power to the electric motor for cruising on plane; and setting a trim for an efficient planing angle when it is determined that the marine vessel is on plane.

7. A controller for planing a marine vessel propelled by an electric propulsion system operably connected to a rotatable propeller system, the controller comprising:

a processor; and a memory comprising computer-executable instructions that, when executed by the processor, cause the processor to perform operations, the operations comprising:

receiving a command input requesting an increase in throttle;

determining whether the marine vessel is on plane;

determining whether there is sufficient power and energy available in the electric propulsion system to reach planing speed when the marine vessel is not on plane; and increasing power output from the electric propulsion system for a selected period of time such that the electric propulsion system is allowed to overshoot continuous power limits of one or more components of the electric propulsion system for the selected amount of time, the one or more components of the electric propulsion system comprising at least one of an electric motor, an energy storage device, and an electric controller.

8. The controller of claim 7, wherein it is determined whether the marine vessel is on plane in response to a throttle position, a water speed, a deck angle, a draft depth, a trim angle, an estimated drag profile, and an estimated load mass.

9. The controller of claim 7, wherein it is determined whether there is sufficient power and energy available in the electric propulsion system to reach planing speed in response to a current history form algorithm, an available power estimation, a current limit requirement, an energy needed to get to planing speed, and a power needed to get to planing speed.

10. The controller of claim 7, wherein the operations further comprise: determining an amount of power output to increase for the selected period of time in response to a target acceleration profile, a water speed, a global positioning system speed, a draft depth, an estimated drag profile, and an estimated load mass.

11. The controller of claim 7, wherein the operations further comprise: decreasing power output from the electric power system at a completion of the selected period of time such that the one or more components of the electric propulsion system are no longer overshooting continuous power limits.

12. The controller of claim 7, wherein the operations further comprise:

adjusting power to the electric motor for cruising on plane; and setting a trim for an efficient planing angle when it is determined that the marine vessel is on plane.

13. A computer program product embodied on a non-transitory computer readable medium, the computer program product including instructions that, when executed by a processor, cause the processor to perform operations for planing a marine vessel propelled by an electric propulsion system operably connected to a rotatable propeller system, the operations comprising:

receiving a command input requesting an increase in throttle;

determining whether the marine vessel is on plane;

determining whether there is sufficient power and energy available in the electric propulsion system to reach planing speed when the marine vessel is not on plane; and increasing power output from the electric propulsion system for a selected period of time such that the electric propulsion system is allowed to overshoot continuous power limits of one or more components of the electric propulsion system for the selected amount of time, the one or more components of the electric propulsion system comprising at least one of an electric motor, an energy storage device, and an electric controller.

14. The computer program product of claim 13, wherein it is determined whether the marine vessel is on plane in response to a throttle position, a water speed, a deck angle, a draft depth, a trim angle, an estimated drag profile, and an estimated load mass.

15. The computer program product of claim 13, wherein it is determined whether there is sufficient power and energy available in the electric propulsion system to reach planing speed in response to a current history form algorithm, an available power estimation, a current limit requirement, an energy needed to get to planing speed, and a power needed to get to planing speed.

16. The computer program product of claim 13, wherein the operations further comprise: determining an amount of power output to increase for the selected period of time in response to a target acceleration profile, a water speed, a global positioning system speed, a draft depth, an estimated drag profile, and an estimated load mass.

17. The computer program product of claim 13, wherein the operations further comprise: decreasing power output from the electric power system at a completion of the selected period of time such that the one or more components of the electric propulsion system are no longer overshooting continuous power limits.

18. The computer program product of claim 13, wherein the operations further comprise:

adjusting power to the electric motor for cruising on plane; and setting a trim for an efficient planing angle when it is determined that the marine vessel is on plane.

* * * * *